United States Patent
Spiess et al.

(10) Patent No.: US 8,240,629 B2
(45) Date of Patent: Aug. 14, 2012

(54) MOUNTS FOR ELEMENTS OF WATER OR HEATING INSTALLATIONS

(75) Inventors: Fritz Spiess, Unterlunkhofen (CH); Michael Burkhart, Bruchweiler (DE)

(73) Assignee: Watts Industries Deutschland GmbH, Landau (DE)

(*) Notice: Subject to any disclaimer, the term of this patent is extended or adjusted under 35 U.S.C. 154(b) by 392 days.

(21) Appl. No.: 12/634,952

(22) Filed: Dec. 10, 2009

(65) Prior Publication Data

US 2010/0181453 A1    Jul. 22, 2010

(30) Foreign Application Priority Data

Dec. 10, 2008  (DE) ............... 20 2008 016 329 U

(51) Int. Cl.
*A47G 1/10* (2006.01)

(52) U.S. Cl. .............. 248/316.7; 24/459; 248/300

(58) Field of Classification Search ........... 248/316.7, 248/75, 49, 65, 74.1, 74.2, 71, 62, 73, 220.21, 248/220.31, 222.11, 222.12, 224.8, 229.16, 248/229.26, 300, 309.1; 24/459
See application file for complete search history.

(56) References Cited

U.S. PATENT DOCUMENTS

| 2,494,881 | A | * | 1/1950 | Kost | 248/229.1 |
| 4,575,038 | A | * | 3/1986 | Moore | 248/505 |
| 4,788,806 | A | * | 12/1988 | Sease | 52/222 |
| 6,621,714 | B1 | * | 9/2003 | Li et al. | 361/801 |
| 6,945,735 | B1 | * | 9/2005 | Doverspike | 405/184.4 |
| 7,427,051 | B2 | * | 9/2008 | Oh | 248/73 |
| 2003/0213876 | A1 | * | 11/2003 | Takeuchi | 248/71 |
| 2005/0072883 | A1 | * | 4/2005 | Michaud et al. | 248/74.1 |
| 2009/0260196 | A1 | * | 10/2009 | Lien | 24/335 |
| 2011/0042533 | A1 | * | 2/2011 | Austin | 248/222.14 |

FOREIGN PATENT DOCUMENTS

DE    199 12 617 A1    9/2000

* cited by examiner

*Primary Examiner* — Ramon Ramirez
(74) *Attorney, Agent, or Firm* — Muncy, Geissler, Olds & Lowe, PLLC

(57) ABSTRACT

A mount for elements of a water or heating installations is provided that includes a base body and a retaining clip that extends around one of the elements and releasably attaches it to the body. The base body and retaining clip are shaped to fit the elements. The retaining clip is U-shaped, has two legs and is made of a resilient, sound-damping plastic. The ends of the legs are bent back in a V shape and first detent projections are formed on the outside of the leg ends. The base body has openings matched to the legs. Formed on the inner wall of the openings are second detent projections, which cooperate with the first detent projections. The ends of the legs are designed to be manipulated by hand.

10 Claims, 3 Drawing Sheets

MOUNTS FOR ELEMENTS OF WATER OR HEATING INSTALLATIONS

This nonprovisional application claims priority under 35 U.S.C. §119(a) to German Patent Application No. DE 20 2008 016 329.3, which was filed in Germany on Dec. 10, 2008, and which is herein incorporated by reference.

BACKGROUND OF THE INVENTION

1. Field of the Invention

The present invention relates to a mount for elements of water or heating installations.

2. Description of the Background Art

From DE 199 12 617 A1 is known a wall mount for installation elements, in particular for heating circuit manifolds. Provided is a base of elongated shape with wall contact surfaces, wall mounting holes, and receptacles for installation elements that can be attached at a distance from one another. Each place for an installation element has associated with it wall mount parts that hold it. The wall mount parts are of formfitting design and have arms. In addition, each receptacle region has a bracket element associated with it. An adapter wedge that can be installed as needed is provided between the bracket element, base, and element support. The mounting support surfaces and the attachment surfaces of the base, bracket element, and adapter wedge are designed with interchangeable, matching contact and support surfaces. All elements are made of plastic. They are attached using screws.

Ordinary commercial mounts made of metal are also known. Here, too, the individual parts are customarily attached using screws.

Mounts made of metal are heavy. Screwed connections are time-consuming. It is thus customary to preassemble mounts and elements at the factory or in the installer's workshop, and to transport them to the installation site in the preassembled state. Transport of elements preassembled in this way can be laborious, in particular when relatively long and branched pipes and similar items are involved. This is not a satisfactory situation.

SUMMARY OF THE INVENTION

It is therefore an object of the present invention to provide mounts that are low in weight and can be assembled easily and quickly on site.

An advantage of the inventive mount resides in the complete elimination of screwed connections, which are replaced by snap-in connections. Snap-in connections are made much more rapidly than screw connections. Since the leg ends of the inventive retaining clips are bent back in a V shape, so that they extend almost parallel to the leg ends themselves, they can be manipulated by hand from the installation side; the retaining clip can thus be removed again quickly and easily without tools when the relevant element is to be adjusted or replaced.

A further advantage resides in the lower weight of plastic as compared to metal. Moreover, the plastic employed is both resilient and sound damping, so that any flow noises of a flowing fluid are not transmitted at all or are transmitted considerably damped.

Since installation can be carried out easily and without tools, it can now take place directly at the construction site. As a result, the individual parts needed can be transported to the construction site loose. This allows for the packaging to be more compact and lighter than before.

It is self-evident that more compact and lighter packaging also requires less space and lower costs for storage and transport.

Advantageously, the base body also has attachment openings, specifically for both the retaining clip and for wall or ceiling mounting.

According to an embodiment of the invention, a resilient saddle is provided between the base body and one of the retained elements. Such a saddle can compensate for any dimensional tolerances. Moreover, it increases the distance between the base body and the retained element.

The saddle can be made from a sound-damping material, e.g., rubber. By this means, the transmission of flow noises is further reduced.

In a further embodiment, one side of the saddle can be flat, and the other can have a concave shape. In this way, the same saddle can be used for both round tubes and rectangular tubes.

According to an embodiment of the invention, the base body can be made of a durable plastic. This reduces weight. Moreover, plastic is corrosion-resistant.

Alternatively, the base body can include a bent sheet metal strip.

According to an embodiment of the invention, the sheet metal strip can have approximately U-shaped offset bends, matched to the dimensions of the legs and the elements to be retained.

For improved matching to elements of different dimensions, multiple first and/or second detent projections can also be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
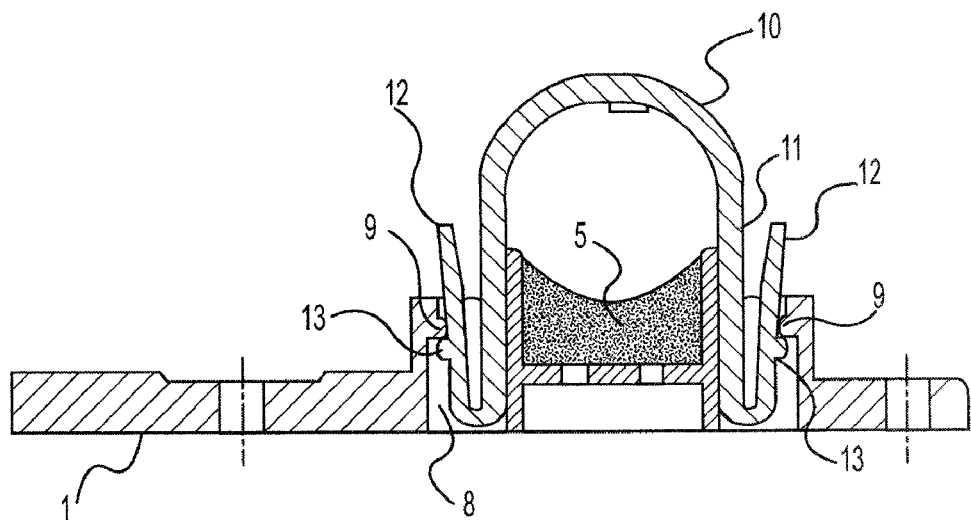
FIG. 1 is a first mount in cross-section.

FIG. 1 shows a cross-section through a mount for elements of water or heating installations. A base body 1 can be seen. This is made of a durable plastic and has attachment openings for wall, floor, or ceiling installation.

Also visible is a U-shaped retaining clip 10 with two parallel legs 11. The ends 12 of the legs 11 are bent back in approximately a V shape and are shaped for manipulation by hand, e.g., with thumb and forefinger.

Provided in the base body 1 are openings 8 into which the legs 11 and leg ends 12 can be inserted. First and second detent projections 13, 9 are provided on the outside of the leg ends 12 and on the inner wall of the openings 8 that cooperate therewith. These detent projections 13, 9 ensure that the retaining clip 10 can be securely but releasably attached to the base body 1.

It is a matter of course that multiple first or second detent projections 13, 9 can also be provided, so that the retaining clip 10 can be pushed into the base body to a greater or lesser depth.

Lastly, visible between the legs 11 of the retaining clip 10 is also a saddle 5 made of a resilient, preferably sound-damping material, e.g., rubber. As can be seen, the top of the saddle 5 is concave, while its underside is flat.

Figure 2:
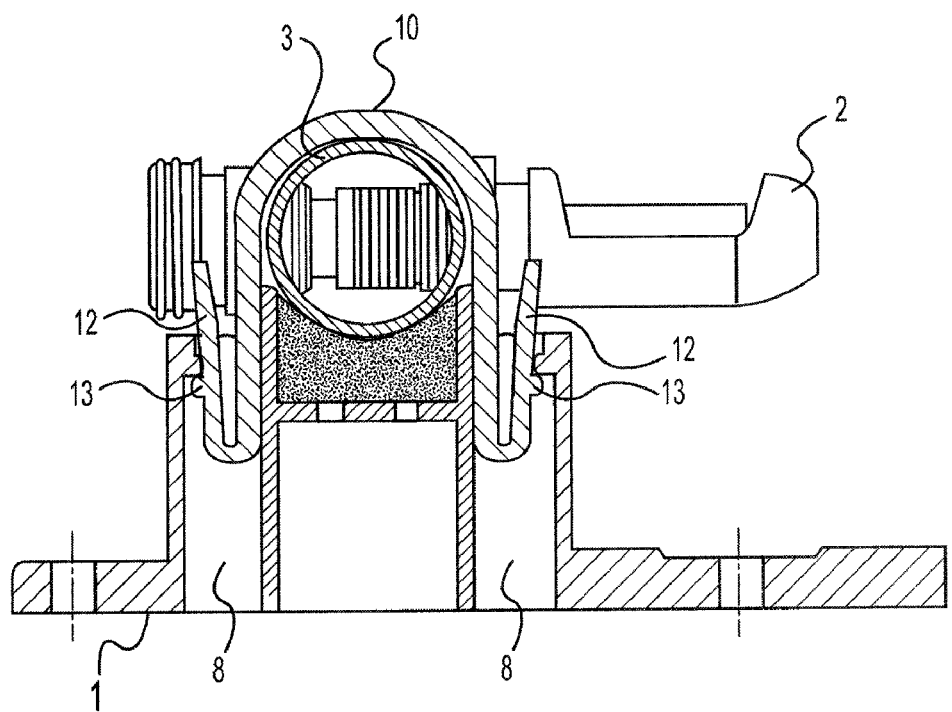
FIG. 2 is a second mount with inserted installation element in cross-section.

FIG. 2 shows, also in cross-section, a second mount to which a round tube 3 with flowmeter 2 is attached. The openings 8 in the base body 1 are elongated for adequate spacing from the base body 1. Also evident is that the concave side of the saddle 5 is matched to the round tube 3.

Figure 3:
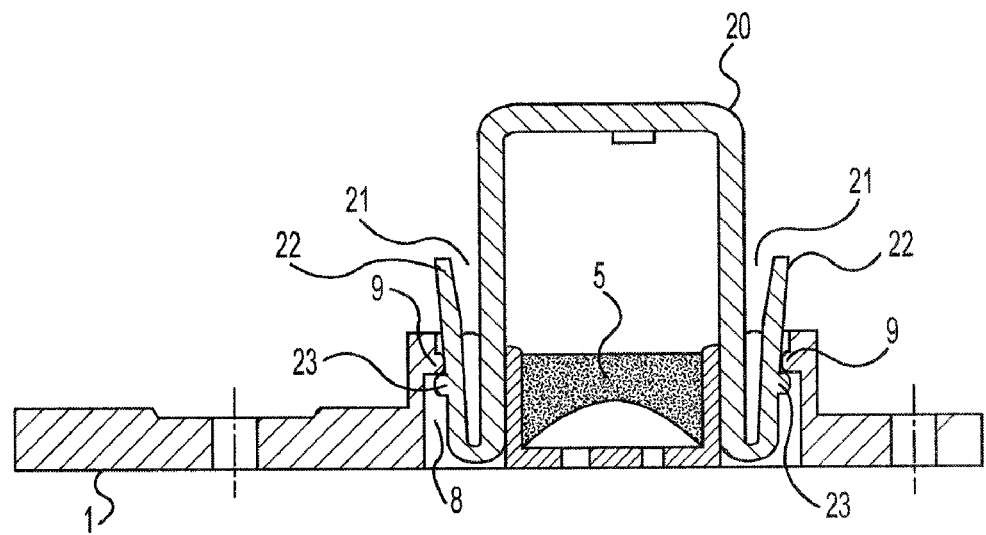
FIG. 3 is a third mount in cross-section.

FIG. 3 shows, likewise in cross-section, a third mount whose retaining clip 20 is shaped for use with rectangular tubes. Matching the rectangular tubes to be used, the saddle 5 is positioned such that its flat side faces up, while its concave side faces down.

Figure 4:
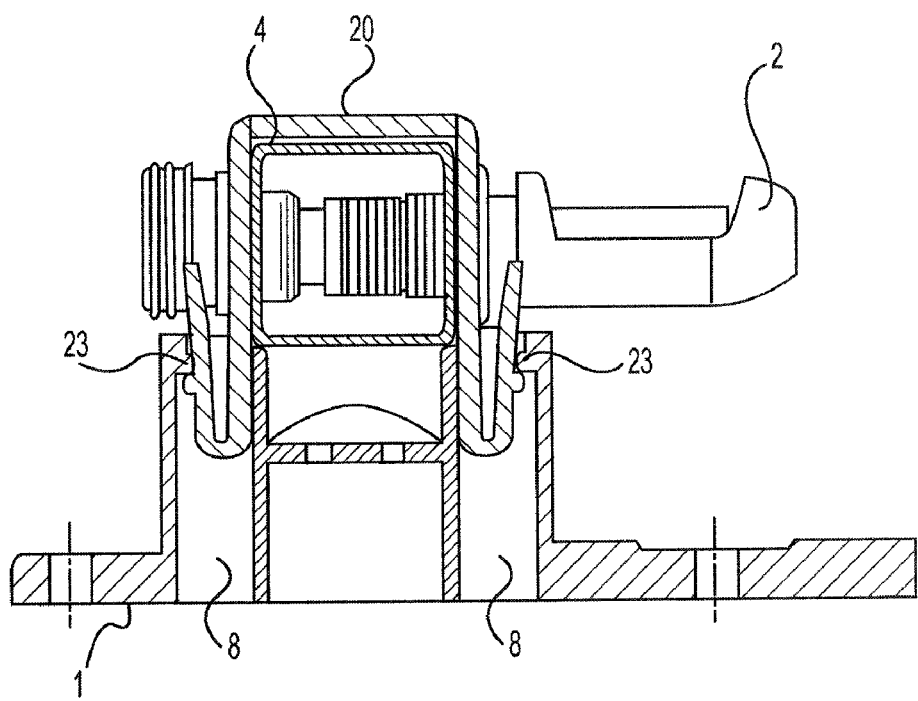
FIG. 4 is a fourth mount with inserted installation element in cross-section.

FIG. 4 shows, likewise in cross-section, a fourth mount. A tube 4 with a square cross-section with an installed flowmeter 2 is visible. The openings 8 in the base body 1 are elongated in a manner comparable to FIG. 2, so that adequate free space is present with respect to the flowmeter 2 and the support of the base body 1.

Figure 5:
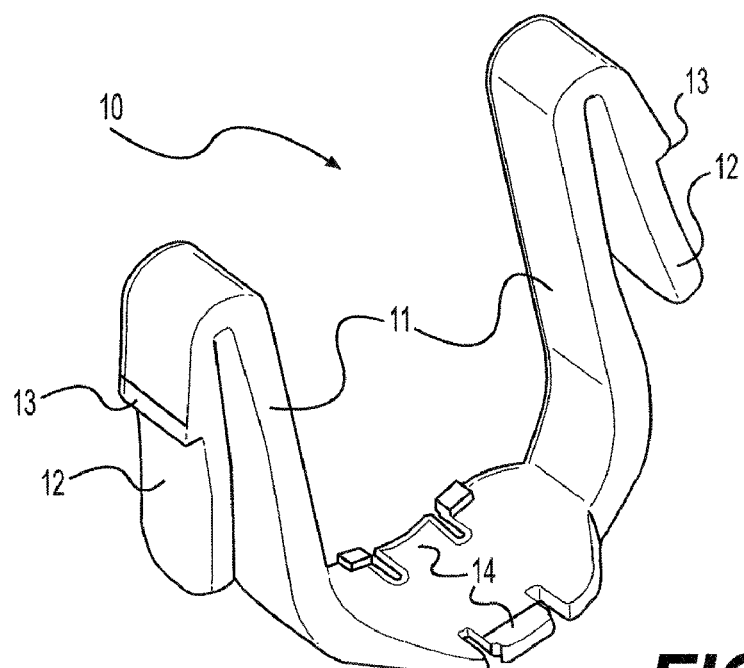
FIG. 5 is an isometric view of a retaining clip at an enlarged scale.

FIG. 5 shows in an isometric view and, at an enlarged scale, a retaining clip 10. Visible are the legs 11 bent back in a V shape, whose ends 12 are designed for manipulation by hand and each have formed on them a first detent projection 13. Also visible on the U-shaped web are resilient tabs 14, which improve the clamping retention of the elements, e.g., tubes, to be retained.

Figure 6:
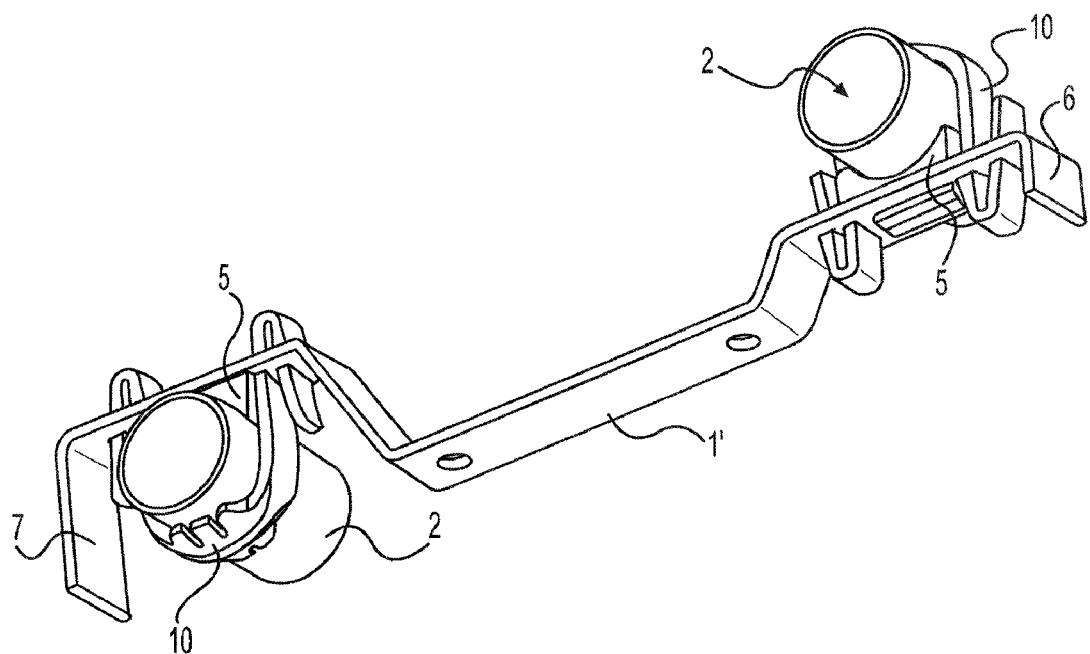
FIG. 6 is an isometric view of a base element with two different installation options.

FIG. 6 shows, likewise in an isometric view, a base body 1' bent from sheet metal strip. This has two U-shaped offset bends 6, 7 of different heights. The offset bend 6 shown on the right side is matched to the inserted ends of the retaining clip 10. In contrast, the offset bend 7 shown on the left side is considerably higher, so that the tube 2 to be retained and the retaining clip 10 can be inserted from below. Such a hanging installation saves space. With base elements of this type, the installed depth of water or heating installations can be reduced without sacrificing stability and ease of installation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A mount for elements of water or heating installations, the mount comprising:
   a base body; and
   a retaining clip configured to extend around one of the elements and configured to releasably attach the element to the body;
   wherein the base body and the retaining clip are shaped to fit the elements,
   wherein the retaining clip is U-shaped, has two legs, and is made of a resilient, sound-damping plastic, ends of the legs being bent back in a V shape,
   wherein first detent projections are formed on an outside of the ends of the legs,
   wherein the base body has openings matched to the legs,
   wherein second detent projections are formed on an inner wall of the openings such that the second detent projections cooperate with the first detent projections, and
   wherein the ends of the legs are configured to be manipulated by hand.

2. The mount according to claim 1, wherein the base body has attachment openings.

3. The mount according to claim 1, wherein a resilient saddle is provided between the base body and one of the elements.

4. The mount according to claim 3, wherein the saddle is made of a sound-damping material.

5. The mount according to claim 3, wherein a first side of the saddle is flat, and a second side has a concave shape.

6. The mount according to claim 3, wherein the saddle is made of rubber.

7. The mount according to one claim 1, wherein the base body is made of a plastic.

8. The mount according to claim 1, wherein the base body is made of a bent sheet metal strip.

9. The mount according to claim 8, wherein the sheet metal strip has U-shaped offset bends matched to a dimension of the legs and matched to the elements of the water or heating installation to be retained.

10. The mount according to claim 1, wherein a plurality of first and/or second detent projections are provided.

\* \* \* \* \*